(12) United States Patent
Zaiser

(10) Patent No.: US 7,611,242 B2
(45) Date of Patent: *Nov. 3, 2009

(54) METHOD FOR CENTERING A SEMIFINISHED SPECTACLE LENS BLANK

(75) Inventor: Michael Zaiser, Boebingen (DE)

(73) Assignee: Carl Zeiss Vision GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/928,982

(22) Filed: Oct. 30, 2007

(65) Prior Publication Data

US 2008/0079896 A1    Apr. 3, 2008

Related U.S. Application Data

(60) Continuation of application No. 11/386,130, filed on Mar. 22, 2006, now Pat. No. 7,306,334, which is a division of application No. 11/177,457, filed on Jul. 8, 2005, now Pat. No. 7,150,528, which is a continuation of application No. PCT/EP2004/000012, filed on Jan. 3, 2004.

(30) Foreign Application Priority Data

Jan. 11, 2003    (DE) ................... 103 00 777

(51) Int. Cl.
    *G02C 7/02* (2006.01)
(52) U.S. Cl. ............... 351/177; 351/178; 351/246; 700/159
(58) Field of Classification Search ........... 351/177
    See application file for complete search history.

(56) References Cited

U.S. PATENT DOCUMENTS

| | | |
|---|---|---|
| 3,737,238 A | 6/1973 | Reiner et al. |
| 3,962,833 A | 6/1976 | Johnson |
| 4,176,501 A | 12/1979 | Bardonnet et al. |
| 5,056,633 A | 10/1991 | Noel |
| 5,498,200 A | 3/1996 | Werner |
| 5,581,347 A * | 12/1996 | Le Saux et al. ............ 356/124 |
| 6,012,965 A | 1/2000 | Savoie |
| 6,034,826 A * | 3/2000 | Helmecke ................ 359/798 |
| 6,056,633 A | 5/2000 | Sesena et al. |
| 6,088,089 A * | 7/2000 | Reis ......................... 356/124 |
| 6,743,486 B1 | 6/2004 | Miyazawa |
| 6,813,536 B1 | 11/2004 | Gottschald |
| 6,913,356 B2 | 7/2005 | Belly et al. |
| 7,053,997 B2 | 5/2006 | Suzuki et al. |
| 7,306,334 B2 * | 12/2007 | Zaiser ....................... 351/178 |
| 2001/0055111 A1 * | 12/2001 | Yoda et al. ................ 356/127 |
| 2004/0142642 A1 * | 7/2004 | Thepot et al. .............. 451/43 |

FOREIGN PATENT DOCUMENTS

| | | |
|---|---|---|
| CA | 2 491 096 A1 | 1/2004 |
| DE | 3829488 A | 3/1990 |
| EP | 0 865 871 A2 | 9/1998 |
| JP | 6034923 A | 2/1994 |
| JP | 7005401 A | 1/1995 |
| JP | 11295672 A | 10/1999 |
| WO | 2004/015482 A2 | 2/2004 |

* cited by examiner

*Primary Examiner*—Jessica T Stultz
(74) *Attorney, Agent, or Firm*—GrayRobinson, P.A.

(57) ABSTRACT

In a method for the parallax-free centering of an optical element, in particular a semifinished product of a future spectacle lens, on a holder of a centering or mounting device, the optical element is provided with engravings, anti centering of the optical element is performed with the aid of the engravings.

11 Claims, 3 Drawing Sheets

"PRIOR ART"

METHOD FOR CENTERING A SEMIFINISHED SPECTACLE LENS BLANK

CROSS REFERENCE TO RELATED APPLICATIONS

This is a Continuation of U.S. patent application Ser. No. 11/386,130, filed Mar. 22, 2006 to which priority is claimed and which has since issued as U.S. Pat. No. 7,036,334 which, in turn, is a Divisional of U.S. patent application Ser. No. 11/177,457 filed on Jul. 8, 2005, now U.S. Pat. No. 7,150,528, which itself is a Continuation of International Application number PCT/EP2004/000012 filed Jan. 3, 2004 which designated the U.S. and claimed priority to German application number DE 103 00 777.6 filed Jan. 11, 2003.

BACKGROUND OF THE INVENTION

The invention relates to a method for the parallax-free centering of an optical element, in particular a semifinished product of a future spectacle lens, on a holder of a centering or mounting device, the optical element being provided with engravings.

DESCRIPTION OF THE RELATED ART

It is already known from the general prior art that semifinished products of non-individual progressive lenses are produced in a casting process. During the casting process, engravings are also introduced into the front side of the semifinished product. The engravings permit an orientation of the semifinished product which is required because of the free form surface of the future progressive lens. After the casting process and possibly surface treatments, the semifinished products are provided with a stamped image and aligned at a mounting device or a blocking device. During the blocking process, the semifinished product is connected to a mount or a blocking piece via blocking material so that, in the following processing steps, the semifinished product can be mounted in processing machines for processing the back surface.

In the case of individual progressive lenses, the semifinished product is produced from a blank in a turning or milling process and a subsequent polishing process. Here, the engravings are applied via a separate process, for example laser processing, engraving or similar methods, to the finished front surface.

DE 38 29 488 C2 discloses an apparatus and a method for centering spectacle lenses, a spectacle bank being aligned on a mount. The image of the blank acquired by a video camera or an image scanner is displayed on a computer screen and the contour of the finished lens, which is input in the computer, is superimposed on it. A top carriage has on its top side a system of coordinates and three identification points seen in the x-direction of the top carriage. The blank has the same identification points. The identification points of the blank and of the mount of the top carriage must cover one another exactly so that the spectacle lens is exactly centered. The method for centering and blocking a spectacle lens is carried out here with the aid of a stamped image on the spectacle lens. Also, this process does not serve for centering semifinished products.

SUMMARY OF THE INVENTION

Consequently, it is an object of the invention to provide a method that permits a simplification of the process steps and simplifies the centering and alignment at a centering and mounting device.

This object is achieved according to the invention by virtue of the fact that the centering of the optical element is performed with the aid of the engravings.

A simple and accurate aligning or centering at the mounting device can be performed with the aid of the engravings provided with the semifinished product/spectacle lens. The process step of "stamping" the semifinished product is therefore eliminated.

Advantageous refinements and developments of the invention emerge from the further subclaims and the exemplary embodiment described below in principle with the aid of the drawings.

DETAILED DESCRIPTION

Figure 1:
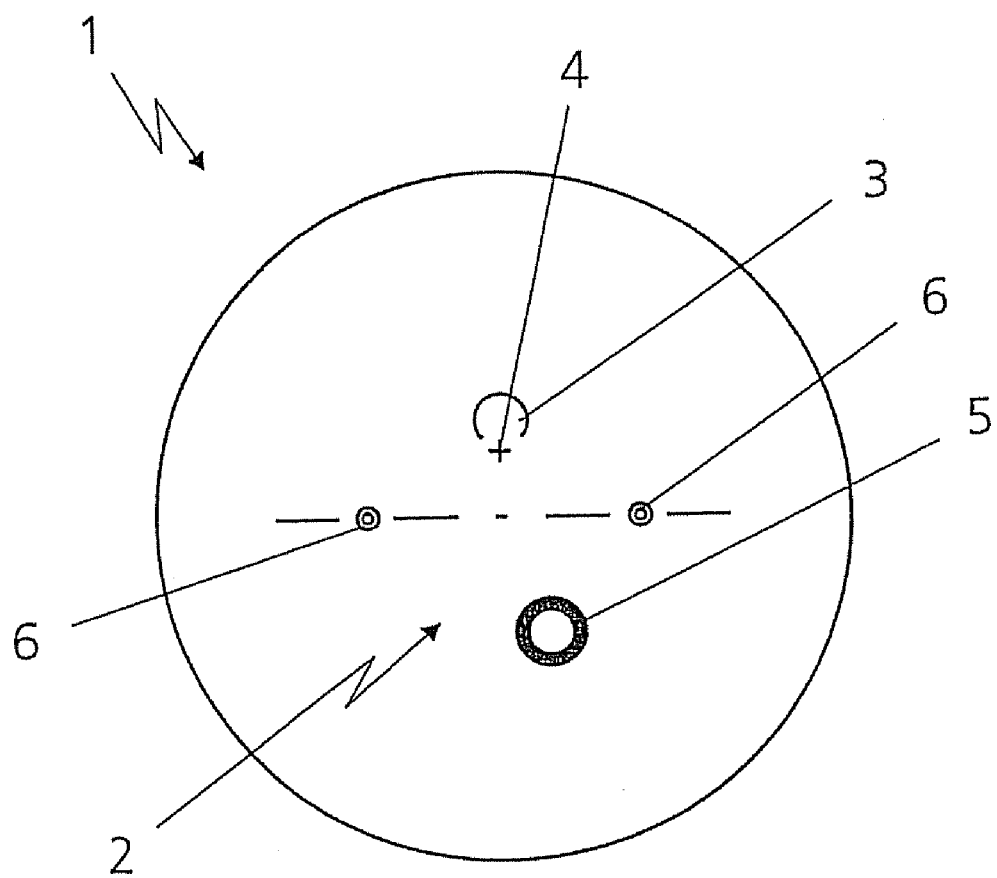
FIG. 1 shows an illustration of the principle of a spectacle lens/semifinished product according to the prior art.

FIG. 1 shows as prior art a semi-finished product 1 that is provided with a stamped image 2. The stamped image 2 is also that stamped image which an ophthalmic optician requires for monitoring the distance power and the near power. According to the prior art, this stamped image 2 consists of a distance measuring circle 3, the ophthalmic optician being able to use a centering cross 4 for the subsequent monitoring of the distance power. Using the known concave-side measuring method, the ophthalmic optician can subsequently measure the required near measured value in a near measuring circle 5. After removal of the stamped image 2, the ophthalmic optician can reconstruct all the reference and measured points with the aid of a pair of mutually-spaced, generally punctiform, lens engravings 6, so-called permanent engravings, and a measuring template. The permanent engravings 6 also identify the spectacle lens type, a spectacle lens identification such as, for example, T66 for the refractive index 1.665 being engraved in each case below an engraving point. The addition is to be found in general under the second engraving point 6, and is likewise engraved. Depending on the manufacturing company, different data are to be found under the nasal and under the nasal and temporal engraving points.

The present inventive method does not require the stamped image 2: this is not the edge processing of spectacle lenses already provided on both sides with optical surfaces such as occur for further processing at the ophthalmic optician's premises.

Figure 2:
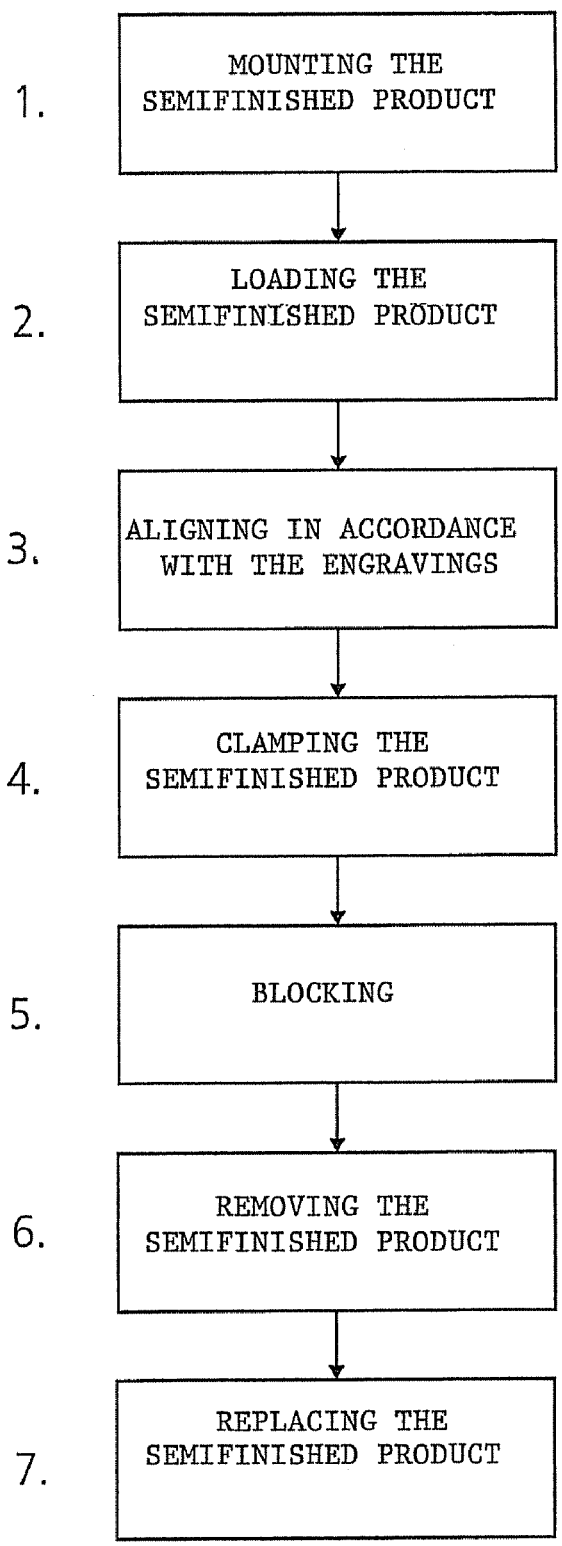
FIG. 2 shows an illustration of the principle of a method according to the invention with the aid of a block diagram.
Figure 3:
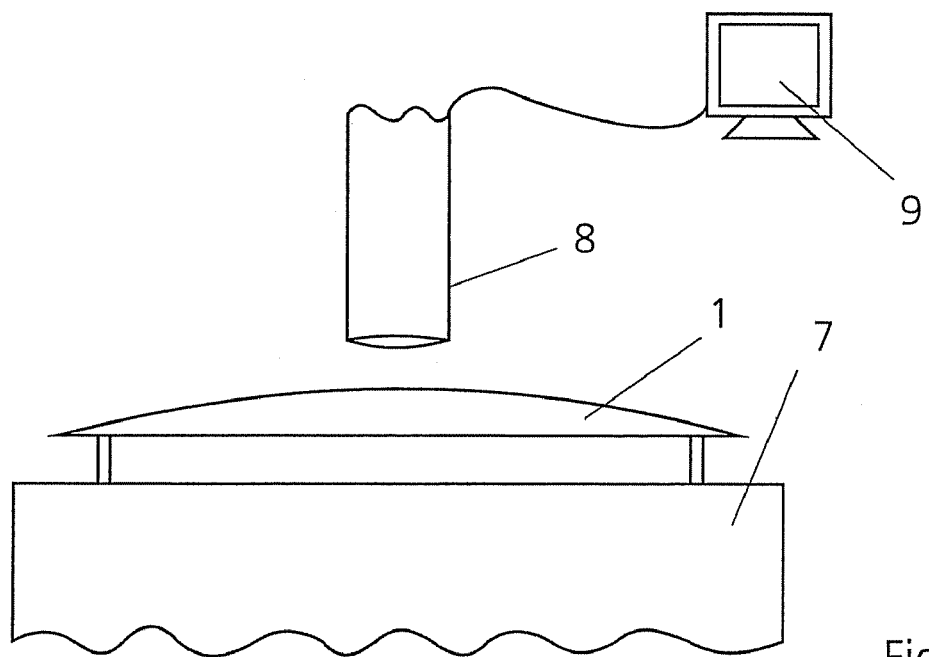
FIG. 3 shows a centering and mounting device with the semifinished product.

The method according to the invention is outlined briefly in FIG. 2 in the manner of a block diagram. The first step is for the semifinished product 1 to be picked up by hand from a transport container, it being possible for a number of semifinished products to be stored in the transport container. In this case, the semifinished product 1 is already varnished or provided with a protective film which is required, in particular, for plastic lenses in order to prevent damage. In the second step, the semifinished product 1 is laid onto a centering and mounting device 7 that is not illustrated in more detail here in FIG. 3. The semifinished product 1 is now aligned with the aid of the engravings 6. This requires the use of an appropriate image processing technique that visualizes the engravings 6 for the operator. Use may be made for this purpose of an appropriately highly resolving camera 8 that records the position of the semifinished product 1 on the centering and mounting device 7. Furthermore, it is possible to use a lighting technique in conjunction with the high resolution camera 8. Whether a lighting technique is required depends on the ambient conditions. The lighting conditions at the production site play a large role here, as does the image processing. If camera systems that are insensitive to ambient lighting are to hand, it would also be possible to require no lighting techniques. Lamps, conventional emitters or else conventional light sources can be used for the lighting technique. This can be necessary in order to produce a certain contrast for the corresponding camera system, the aim being that the depressions of the engravings 6 produce a shadow image.

The output signal generated via the camera 8 can be evaluated with the aid of appropriate software and displayed to the operator on a screen 9. The desired position of the engravings 6 can also be prescribed on the screen 9. Once the semifinished product 1 has been placed on the centering and mounting device 7, the desired position of the engravings 6 can be read in or faded in on the screen 9 with the aid of input commands. The operator turns or positions the semifinished product 1 until the engravings 6 of the semifinished product 1 come to lie within the desired position. The blocking process can then be initiated, the semifinished product 1 generally firstly being clamped via a clamping mechanism before the actual blocking process can begin.

The start of the blocking process can also be linked with the desired position via intelligent evaluation software such that the blocking process cannot be started until the semifinished product 1 is located in the correct lens position, that is to say within the permissible desired position.

The current lens position can be illustrated in x/y coordinates on the screen 9 as a deviation from the desired position. This favors simple operation by means of a WINDOWS interface. The correct lens position can be signaled by signaling elements.

Once the blocking process has been initiated, the semifinished product 1 can now be taken from the centering and mounting device 7 and laid back into the transport container. Of course, it is also possible to let the process steps one to seven run automatically, which means that the handling of the semifinished product 1, and the decision on correct block position, could be taken over by a handling system or a control unit, for example by a robot.

It would also be possible in principle, in addition to the possibility already mentioned above, to make use for the alignment at the centering and mounting device 7 of a first mount that is required for processing the front surface. Since the semifinished product 1 already has a defined position on the first mount, this position can now be retained until a second mount can be fixed accurately in position onto the semifinished product 1. A detailed description is disclosed in DE 102 29 150.0, which is a prior publication.

It is thereby possible to align the semifinished product 1 on the centering and mounting device with the aid of the engravings 6, which are always introduced into the semifinished product 1, especially in the case of progressive lenses. The process step of "stamping" can thereby be eliminated, and the method therefore results in higher productivity and economical operation.

What is claimed is:

1. A method for centering a semifinished product of a future spectacle lens, namely, a semifinished lens blank, for a spectacle lens on a mounting device, said method comprising the steps of:
    a.) providing a semifinished lens blank for a spectacle lens, said semifinished lens blank having at least one permanent engraving formed therein at least one respective location lying interiorly of a peripheral edge portion of said semifinished lens blank;
    b.) generating an image of said at least one engraving, said image representing a relative positional relationship between a current position of said semifinished lens blank with respect to the mounting device and a centered position of said semifinished lens blank with respect to the mounting device, and
    c.) changing said current positional relationship based on information derived from said image to cause said current position to substantially correspond with said centered position.

2. A method as claimed in claim 1, further comprising the step of providing a visual indication of said current position.

3. A method as claimed in claim 1, further comprising the step of initiating a blocking process conditioned upon said current position and said centered position being sufficiently aligned with one another.

4. A method as claimed in claim 1 wherein said at least one engraving comprises an engraving formed in a process of casting said semifinished lens blank.

5. A method for centering a semifinished lens blank for a spectacle lens, on a mounting device, said method comprising the steps of:
    a.) forming at least one engraving in the lens blank, said at least one engraving comprising at least one depression in a surface of the semifinished lens blank;
    b.) illuminating the semifinished lens blank such that said at least one depression forms a shadow, and
    c.) centering said semifinished spectacle lens blank with respect to the mounting device based on information derived from an image of said shadow.

6. A method as claimed in claim 5 wherein said at least one engraving is formed in a casting process.

7. A method for centering a semifinished lens blank for a spectacle lens on a mounting device, said method comprising the steps of:
    a.) providing a semifinished lens blank for a spectacle lens, said semifinished lens blank having at least one permanent engraving formed interiorly of a peripheral edge portion of said semifinished lens blank;
    b.) determining a positional relationship between said semifinished lens blank and the mounting device using information derived from a signal representing at least one respective location of said at least one engraving, and
    c.) changing said positional relationship based on said information to center said optical element with respect to the mounting device.

8. A method as claimed in claim 7 wherein said semifinished lens blank includes a surface to be polished after said semifinished spectacle lens blank has been centered with respect to the mounting device, and wherein said at least one engraving is located on said surface to be polished.

9. A method as claimed in claim 7 wherein said engravings comprise at least one depression and said method further comprises the steps of (i) illuminating said semifinished spectacle lens blank so that said at least one depression forms a shadow, and (ii) generating said signal from an image of said shadow.

10. A method as claimed in claim 7 wherein said at least one engraving comprises an engraving formed during a process of casting said semifinished lens blank.

11. A method for centering a semifinished lens blank for a spectacle lens, on a mounting device, said method comprising the steps of:

a.) providing a semifinished lens blank for a spectacle lens, said semifinished lens blank having at least one permanent engraving formed therein at least one respective location lying interiorly of a peripheral edge portion of said semifinished lens blank;

b.) generating an image of said at least one engraving, said image representing a relative positional relationship between a current position of said semifinished lens blank with respect to the mounting device and a centered position of said semifinished lens blank with respect to the mounting device, and c.) manually changing said current positional relationship based on information derived from said image to cause said current position to substantially correspond with said centered position.

* * * * *

UNITED STATES PATENT AND TRADEMARK OFFICE
CERTIFICATE OF CORRECTION

PATENT NO. : 7,611,242 B2  
APPLICATION NO. : 11/928982  
DATED : November 3, 2009  
INVENTOR(S) : Michael Zaiser Page 1 of 1

It is certified that error appears in the above-identified patent and that said Letters Patent is hereby corrected as shown below:

On the title page, item (57), line 4, in the Abstract
change "anti centering" to --and centering--

Column 1, line 10
change "U.S. Pat. No. 7,036,334" to --U.S. Pat. No. 7,306,334--

Signed and Sealed this

Thirteenth Day of April, 2010

David J. Kappos
*Director of the United States Patent and Trademark Office*